United States Patent
Åström et al.

(10) Patent No.: US 11,950,185 B2
(45) Date of Patent: Apr. 2, 2024

(54) WAKE-UP SIGNAL CONFIGURATION

(71) Applicant: Telefonaktiebolaget LM Ericsson (publ), Stockholm (SE)

(72) Inventors: Magnus Åström, Lund (SE); Anders Wallén, Ystad (SE); Andreas Höglund, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 394 days.

(21) Appl. No.: 17/267,777

(22) PCT Filed: Aug. 12, 2019

(86) PCT No.: PCT/IB2019/056845
§ 371 (c)(1),
(2) Date: Feb. 10, 2021

(87) PCT Pub. No.: WO2020/031163
PCT Pub. Date: Feb. 13, 2020

(65) Prior Publication Data
US 2021/0329553 A1    Oct. 21, 2021

Related U.S. Application Data

(60) Provisional application No. 62/717,516, filed on Aug. 10, 2018.

(51) Int. Cl.
*H04W 52/02* (2009.01)
*H04W 4/80* (2018.01)
*H04W 68/00* (2009.01)

(52) U.S. Cl.
CPC ......... *H04W 52/0229* (2013.01); *H04W 4/80* (2018.02); *H04W 68/005* (2013.01)

(58) Field of Classification Search
None
See application file for complete search history.

(56) References Cited

U.S. PATENT DOCUMENTS 11,082,976 B2 *  8/2021  Suh ................... H04W 52/0235
11,445,441 B2 *  9/2022  Wang ................... H04L 5/0053
(Continued)

FOREIGN PATENT DOCUMENTS

CN     107360619 A     11/2017
CN     107820721 A      3/2018
(Continued)

OTHER PUBLICATIONS

International Search Report and the Written Opinion of the International Searching Authority, issued in corresponding International Application No. PCT/IB2019/056845, dated Nov. 15, 2019, 16 pages.

(Continued)

*Primary Examiner* — German Viana Di Prisco
(74) *Attorney, Agent, or Firm* — Rothwell, Figg, Ernst & Manbeck, P.C.

(57) ABSTRACT

Systems and methods for configuring wake-up signals are provided. A network node allocates a first wake-up signal (WUS) at a first frequency location and one or more second WUSs at second frequency location(s). Responsive to receiving a page associated with a wireless device, the network node transmits the appropriate first or second WUS on the configured frequency.

20 Claims, 7 Drawing Sheets

(56) References Cited

U.S. PATENT DOCUMENTS

| | | | | |
|---|---|---|---|---|
| 2020/0359323 | A1* | 11/2020 | Beale | H04W 52/0229 |
| 2020/0367168 | A1* | 11/2020 | Hwang | H04W 52/0229 |
| 2021/0314869 | A1* | 10/2021 | Ye | H04J 13/00 |
| 2021/0321360 | A1* | 10/2021 | Wong | H04W 68/00 |

FOREIGN PATENT DOCUMENTS

| | | |
|---|---|---|
| WO | 2016209726 A1 | 12/2016 |
| WO | 2019096704 A1 | 5/2019 |

OTHER PUBLICATIONS

Vivo "Remaining aspects on wake-up signals for efeMTC" 3GPP TSG RAN WG1 Meeting #92bis, R1-1803804, Sanya, China, Apr. 16-20, 2018, 5 pages.

Sierra Wireless "Wake-Up Signal Design Considerations" 3GPP TSG RAN WG1 Meeting #93, R1-1806001, Busan, Korea, May 21-May 25, 2018, 9 pages.

Qualcomm "Remaining issues of 6.2.6.3 Wake-up signal" 3GPP TSG RAN WG1 Meeting #93, R1-1807528, Busan, Korea, May 21-25, 2018, 12 pages.

Vivo "Remaining aspects on wake-up signals for feNB-IoT" 3GPP TSG RAN WG1 Meeting #92bis, R1-1803805, Sanya, China, Apr. 16-20, 2018, 7 pages.

Qualcomm Incorporated "Remaining issues on WUS for MTC" 3GPP TSG RAN WG1 Meeting #93, R1-1807104, Busan, Korea, May 21-25, 2018, 12 pages.

ZTE "Discussion on Wake-up signal for MTC" 3GPP TSG RAN WG1 Meeting #96, R1-1901857, Athens, Greece, Feb. 25-Mar. 1, 2019, 7 pages.

Ericsson, "New WID on Rel-16 MTC enhancements for LTE" 3GPP TSG RAN Meeting #80 RP-181450, La Jolla, USA, Jun. 11-14, 2018, 4 pages.

* cited by examiner

WAKE-UP SIGNAL CONFIGURATION

CROSS REFERENCE TO RELATED APPLICATION(S)

This application is a 35 U.S.C. § 371 National Phase of PCT/IB2019/056845, filed Aug. 12, 2019, designating the United States, which claims the benefit of U.S. Provisional Application No. 62/717,516, filed Aug. 10, 2018, the disclosures of which are incorporated herein by this reference.

TECHNICAL FIELD

The present disclosure generally relates to wireless communications and wireless communication networks.

INTRODUCTION

The Internet of Things (IoT) is a vision for the future world where everything that can benefit from a connection will be connected. Cellular technologies are being developed or evolved to play a role in the IoT world, particularly the machine type communication (MTC). MTC is characterized by lower demands on data rates than, for example, mobile broadband, but with higher requirements on low cost device design, better coverage, and ability to operate for years on batteries without charging or replacing the batteries, etc. To meet the IoT design objectives, standardization bodies such as the Third Generation Partnership Project (3GPP) have standardized Narrowband IoT (NB-IoT) in Release 13 to include a system bandwidth of 180 kHz and target improved coverage, long battery life, low complexity communication design, and network capacity that is sufficient for supporting a massive number of devices.

3GPP specification Releases 13 and 14 include enhancements to support MTC with new user equipment (UE) categories (e.g. Cat-M1, Cat-M2), supporting reduced bandwidth of 6 physical resource blocks (PRBs) (up to 24 PRBs for Cat-M2), and NB-IoT UEs providing a new radio interface (and UE categories, Cat-NB1 and Cat-NB2).

The LTE enhancements introduced in 3GPP Release 13,14 and 15 for MTC will be referred to as "eMTC", including but not limited to support for bandwidth-limited UEs, Cat-M1, and support for coverage enhancements. This is to separate the discussion from NB-IoT (notation here used for any Release), although the supported features are similar on a general level.

There are multiple differences between "legacy" LTE and the procedures and channels defined for eMTC and for NB-IoT. Some differences include a new physical channel, such as the physical downlink control channels, called MPDCCH in eMTC and NPDCCH in NB-IoT, and a new physical random-access channel, NPRACH, for NB-IoT. Another difference is the coverage level (also referred to as coverage enhancement level) that these technologies can support. By applying repetitions to the transmitted signals and channels, both eMTC and NB-IoT allow UE operation down to a lower SNR level as compared to LTE. For example, Es/Iot≥−15 dB being the lowest operating point for eMTC and NB-IoT which can be compared to −6 dB Es/IoT for "legacy" LTE.

In Release 15, there is a common objective for power savings for both NB-IoT and eMTC. The description for NB-IoT is as follows:

A. Work on the following objectives to commence from RAN#75 (according to TU allocation per WG) and strive for completion by RAN#78:

Further Latency and Power Consumption Reduction
Power Consumption Reduction for Physical Channels
Study and, if found beneficial, specify for idle mode paging and/or connected mode DRX, physical signal/channel that can be efficiently decoded or detected prior to decoding NPDCCH/NPDSCH. [RAN1, RAN2, RAN4]

Similarly, for eMTC:

Improved power consumption:

Power consumption reduction for physical channels [RAN1 lead, RAN2, RAN4]

Study and, Wound beneficial for idle mode paging and/or connected mode DRX, specify physical signal/channel that can be efficiently decoded or detected prior to decoding the physical downlink control/data channel.

A "Wake-up signal" (WUS) is based on the transmission of a short signal that indicates to a UE that it should continue to decode the DL control channel, e.g. full MPDCCH for eMTC. If such signal is absent (DTX, i.e. the UE does not detect it) then the UE can go back to sleep without decoding the DL control channel. The decoding time for a WUS is considerably shorter than that of the full MPDCCH since it essentially only needs to contain one bit of information, whereas the MPDCCH may contain up to 35 bits of information. This, in turn, can reduce UE power consumption and lead to longer UE battery life. The WUS can be transmitted only when there is paging for the UE. But if there is no paging for the UE, then the WUS will not be transmitted (i.e., implying a discontinuous transmission (DTX)) and the UE would go back to sleep, e.g. upon detecting DTX instead of WUS.

FIG. 1 illustrates the location of a WUS and the paging occasion (PO) to which it is associated. In FIG. 1, the white blocks indicate possible WUS (10, 50) and PO (20, 60) positions whereas the black boxes indicate actual WUS (30) and PO (40) positions.

The specification of Release 15 WUS is spread out over several parts of the LTE 36-series standard, e.g., 36.211, 36.213, 36.304 and 36.331. The sequence is, for example, defined in TS 36.211 as follows:

The MWUS sequence w(m) in subframe x=0, 1, ..., M−1 is defined by $$w(m) = \theta_{n_f, n_s}(m') \cdot e^{\frac{j\pi u n(n+1)}{131}}$$

$$m = 0, 1, \ldots, 131$$

$$m' = m + 132x$$

$$n = m \bmod 132$$

$$\theta_{n_f, n_s}(m') = \begin{cases} 1, & \text{if } c_{n_f, n_s}(2m') = 0 \text{ and } c_{n_f, n_s}(2m'+1) = 0 \\ -1, & \text{if } c_{n_f, n_s}(2m') = 0 \text{ and } c_{n_f, n_s}(2m'+1) = 1 \\ j, & \text{if } c_{n_f, n_s}(2m') = 1 \text{ and } c_{n_f, n_s}(2m'+1) = 0 \\ -j, & \text{if } c_{n_f, n_s}(2m') = 1 \text{ and } c_{n_f, n_s}(2m'+1) = 1 \end{cases}$$

$$u = (N_{ID}^{cell} \bmod 126) + 3$$

where M is the actual duration of MWUS as defined in 3GPP TS 36.213.

The scrambling sequence $c_{n_f, n_s}(i)$, i=0, 1, ..., 2·132M−1 is given by clause 7.2, and shall be initialized at the start of the MWUS with $$c_{init\_WUS} = (N_{ID}^{cell} + 1)\left(\left(10 n_{f\_start\_PO} + \left\lfloor \frac{n_{s\_start\_PO}}{2} \right\rfloor\right) \bmod 2028 + 1\right) 2^9 + N_{ID}^{cell}$$

where $n_{f\_start\_PO}$ is the first frame of the first PO to which the MWUS is associated, and $n_{s\_start\_PO}$ is the first slot of the first PO to which the MWUS is associated.

And further:

The MWUS bandwidth is 2 consecutive PRBs, the frequency location of the lowermost PRB signaled by higher layers. For both PRB pairs in the frequency domain, for which MWUS is defined, the MWUS sequence w(m) shall be mapped to resource elements (k, l) in sequence, starting with w(0) in increasing order of first the index k=0, 1, ..., $NR_{sc}^{RB}-1$, over the 12 assigned subcarriers and then the index l=3, 4, ..., $2N_{symb}^{DL}-1$ in each subframe in which MWUS is transmitted.

As is described in the above equations, the WUS sequence is only dependent on the time instance of the PO to which it is associated and the eNB cell ID. This implies that it is not possible to further distinguish which UE(s) that is paged among the UEs belonging to the same PO. In most cases only a single UE is paged at a time. In which case, the remaining UEs will unnecessarily monitor the subsequent MPDCCH.

SUMMARY

It is an object of the present disclosure to obviate or mitigate at least one disadvantage of the prior art.

There are provided systems and methods for configuring wake-up signals.

In a first aspect there is provided a method performed by a network node. The method includes allocating a first wake-up signal (WUS) at a first frequency location; and allocating a second WUS at a second frequency location based at least in part on the first frequency location. Responsive to receiving a page associated with a wireless device configured for the first WUS, the network nodes transmits the first WUS on the first frequency location. Responsive to receiving a page associated with a wireless device configured for the second WUS, the network node transmits the second WUS on the second frequency location.

In another aspect there is provided a network node comprising a radio interface and processing circuitry. The network node is configured to allocate a first wake-up signal (WUS) at a first frequency location and to allocate a second WUS at a second frequency location based at least in part on the first frequency location. Responsive to receiving a page associated with a wireless device configured for the first WUS, the network nodes transmits the first WUS on the first frequency location. Responsive to receiving a page associated with a wireless device configured for the second WUS, the network node transmits the second WUS on the second frequency location.

In some embodiments, the first WUS can be allocated at a first time location and the second WUS can be allocated at a second time location. In some embodiments, a duration of transmission of the first WUS can differ from a duration of transmission of the second WUS. In some embodiments, a scrambling sequence for the first WUS can differ from a scrambling sequence for the second WUS.

In some embodiments, allocating a plurality of second WUSs can be allocated at a plurality of second frequency locations. In some embodiments, each of the plurality of second WUSs can correspond to a wireless device grouping. In some embodiments, the network node determines one of the plurality of second WUSs to transmit in accordance with an identity of the wireless device configured for the second WUS. In some embodiments, the plurality of second WUSs are frequency multiplexed within a paging narrowband.

In some embodiments, the first and second frequency locations are on separate resource blocks within a paging narrowband. In some embodiments, the second frequency location can be determined in accordance with a resource block set not including the first frequency location.

In some embodiments, the first and second frequency locations are on separate paging narrowbands.

In some embodiments, the first WUS can be associated with a first generation of a wireless system specification and the second WUS can be associated with a second generation of the wireless system specification.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

Figure 1:
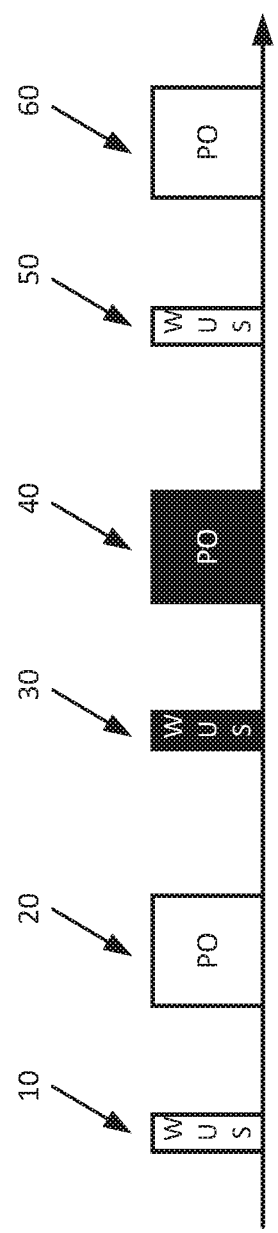
FIG. 1 illustrates an example wake-up signal and paging occasion.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In some embodiments, the non-limiting term "user equipment" (UE) is used and it can refer to any type of wireless device which can communicate with a network node and/or with another UE in a cellular or mobile or wireless communication system. Examples of UE are target device, device to device (D2D) UE, machine type UE or UE capable of machine to machine (M2M) communication, personal digital assistant, tablet, mobile terminal, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrow band IoT (NB-IoT) UE, UE Cat NB1, etc. Example embodiments of a UE are described in more detail below with respect to FIG. 6.

In some embodiments, the non-limiting term "network node" is used and it can correspond to any type of radio access node (or radio network node) or any network node, which can communicate with a UE and/or with another network node in a cellular or mobile or wireless communication system. Examples of network nodes are NodeB, MeNB, SeNB, a network node belonging to MCG or SCG, base station (BS), multi-standard radio (MSR) radio access node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, Self-organizing Network (SON), positioning node (e.g. E-SMLC), MDT, test equipment, etc. Example embodiments of a network node are described in more detail below with respect to FIG. 8.

In some embodiments, the term "radio access technology" (RAT) refers to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term "radio node" used herein can be used to denote a wireless device or a network node.

In some embodiments, a UE can be configured to operate in carrier aggregation (CA) implying aggregation of two or more carriers in at least one of downlink (DL) and uplink (UL) directions. With CA, a UE can have multiple serving cells, wherein the term 'serving' herein means that the UE is configured with the corresponding serving cell and may receive from and/or transmit data to the network node on the serving cell e.g. on PCell or any of the SCells. The data is transmitted or received via physical channels e.g. PDSCH in DL, PUSCH in UL, etc. A component carrier (CC) also interchangeably called as carrier or aggregated carrier, PCC or SCC is configured at the UE by the network node using higher layer signaling e.g. by sending RRC configuration message to the UE. The configured CC is used by the network node for serving the UE on the serving cell (e.g. on PCell, PSCell, SCell, etc.) of the configured CC. The configured CC is also used by the UE for performing one or more radio measurements (e.g. RSRP, RSRQ, etc.) on the cells operating on the CC, e.g. PCell, SCell or PSCell and neighboring cells.

In some embodiments, a UE can also operate in dual connectivity (DC) or multi-connectivity (MC). The multi-carrier or multicarrier operation can be any of CA, DC, MC, etc. The term "multicarrier" can also be interchangeably called a band combination.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL or in either direction on a sidelink) or bidirectional (e.g., RTT, Rx-Tx, etc.). Some examples of radio measurements: timing measurements (e.g., propagation delay, TOA, timing advance, RTT, RSTD, Rx-Tx, etc.), angle measurements (e.g., angle of arrival), power-based or channel quality measurements (e.g., path loss, received signal power, RSRP, received signal quality, RSRQ, SINR, SNR, interference power, total interference plus noise, RSSI, noise power, CSI, CQI, PMI, etc.), cell detection or cell identification, RLM, SI reading, etc. The measurement may be performed on one or more links in each direction, e.g., RSTD or relative RSRP or based on signals from different transmission points of the same (shared) cell.

The term "signaling" used herein may comprise any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "time resource" used herein may correspond to any type of physical resource or radio resource expressed in terms of length of time. Examples of time resources include: symbol, time slot, sub-frame, radio frame, TTI, interleaving time, etc. The term "frequency resource" may refer to sub-band within a channel bandwidth, subcarrier, carrier frequency, frequency band. The term "time and frequency resources" may refer to any combination of time and frequency resources.

Some examples of UE operation include: UE radio measurement (see the term "radio measurement" above), bidirectional measurement with UE transmitting, cell detection or identification, beam detection or identification, system information reading, channel receiving and decoding, any UE operation or activity involving at least receiving of one or more radio signals and/or channels, cell change or (re)selection, beam change or (re)selection, a mobility-related operation, a measurement-related operation, a radio resource management (RRM)-related operation, a positioning procedure, a timing related procedure, a timing adjustment related procedure, UE location tracking procedure, time tracking related procedure, synchronization related procedure, MDT-like procedure, measurement collection related procedure, a CA-related procedure, serving cell activation/deactivation, CC configuration/de-configuration, etc.

Figure 2:
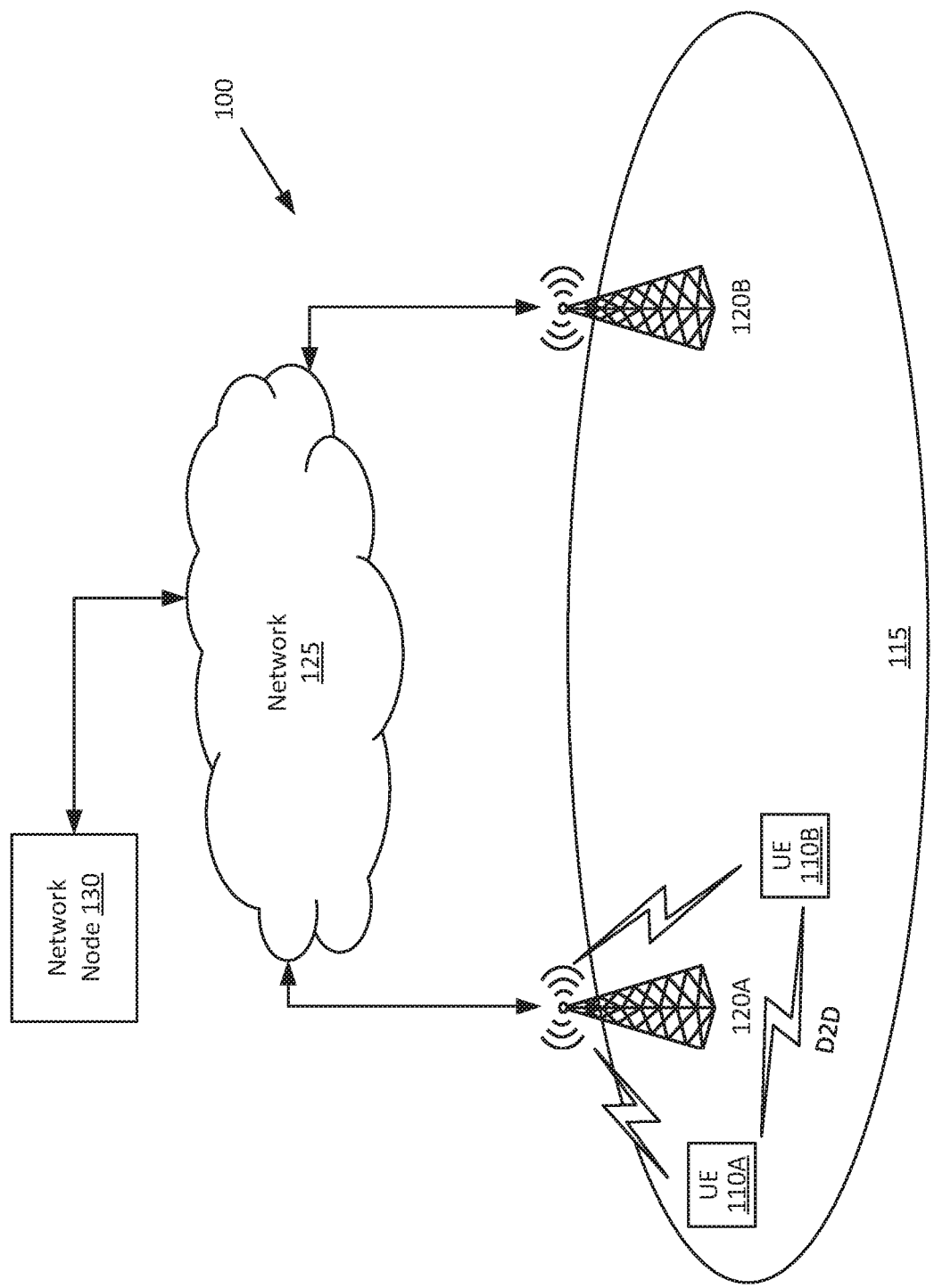
FIG. 2 illustrates an example wireless network.

FIG. 2 illustrates an example of a wireless network 100 that can be used for wireless communications. Wireless network 100 includes wireless devices, such as UEs 110A-110B, and network nodes, such as radio access nodes 120A-120B (e.g. eNBs, gNBs, etc.), connected to one or more core network nodes 130 via an interconnecting network 125. The network 100 can use any suitable deployment scenarios. UEs 110 within coverage area 115 can each be capable of communicating directly with radio access nodes 120 over a wireless interface. In some embodiments, UEs 110 can also be capable of communicating with each other via D2D communication.

As an example, UE 110A can communicate with radio access node 120A over a wireless interface. That is, UE 110A can transmit wireless signals to and/or receive wireless signals from radio access node 120A. The wireless signals can contain voice traffic, data traffic, control signals, and/or any other suitable information. In some embodiments, an area of wireless signal coverage 115 associated with a radio access node 120 can be referred to as a cell.

The interconnecting network 125 can refer to any interconnecting system capable of transmitting audio, video, signals, data, messages, etc., or any combination of the preceding. The interconnecting network 125 can include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the network node 130 can be a core network node 130, managing the establishment of communication sessions and other various other functionalities for UEs 110. Examples of core network node 130 can include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), MDT node, etc. UEs 110 can exchange certain signals with the core network node using the non-access stratum layer. In non-access stratum signaling, signals between UEs 110 and the core network node 130 can be transparently passed through the radio access network. In some embodiments, radio access nodes 120 can interface with one or more network nodes over an internode interface.

As discussed, conventional solutions do not allow for distinguishing a particular UE, or UEs, to be paged among all of the UEs belonging to the same paging occasion (PO).

For 3GPP Release 16, it has been agreed that wake-up signals (WUSs) should be further developed to also include UE grouping, such that the number of UEs that are sensitive to the WUS is further narrowed down to a subset of the total number of UEs that are associated with a specific PO.

One objective of 3GPP is to specify the following set of improvements for machine-type communications for BL/CE UEs: Improved DL transmission efficiency and/or UE power consumption; specify support for UE-group WUS [RAN1, RAN2, RAN4].

As 3GPP Release 15 for MTC only defines a single WUS for each PO, a WUS allowing for UE grouping can be introduced in a future release. UE grouping is one means to further narrow down the number of UEs that are affected by a WUS such that false WUS detections are reduced, in turn reducing unnecessary MPDCCH detections and thereby improving power consumption.

Since the first (e.g. present) generation of WUSs does not support UE grouping but will need to coexist with the second (e.g. subsequent) generation of WUSs, solutions that facilitate such coexistence without limiting the second generation of WUS if such coexistence is not configured may be beneficial.

Some embodiments described herein include a method for providing a second WUS configuration in a system already providing a first WUS configuration. The two WUS configurations may be undesirable to mix or combine in the same resource set since that may require an extended monitoring by, for example, a Rel-16 UE in case it must decode both Rel-15 and Rel-16 WUS, increasing the false alarm rate and power consumption and thereby partially negating the benefits of the WUS. In the first step, a first WUS is allocated in a first frequency location. In a second step, a second WUS is allocated in a second frequency location. In a third step, if a paging message is to be transmitted to a UE associated with the first WUS, the first WUS is transmitted. In a fourth step, if a paging message is to be transmitted to a UE associated with the second WUS, the second WUS is transmitted.

In an alternative embodiment, the first WUS can be a special case of the more general and grouped second WUS. For example, the first WUS can correspond to the group comprising "all UEs", effectively waking up any/all UEs with the associated Paging Occasion (e.g. used for System Information change notification, etc.). The second WUS can contain this group and other groups which correspond to subsets of UEs that are associated with the Paging Occasion. The first WUS can be a special case of the second WUS as either a special signal, a special code sequence, or a special frequency position, etc.

Accordingly, some embodiments allow for a coexistence of two generations of WUS within the same carrier or even paging narrowband. Hence, a flexible utilization of the network is possible, improving network usability. The generations of WUS can be contained in the same physical resources, simplifying scheduling, such that both first generation (e.g. Rel-15) and second generation (e.g. Rel-16) UEs can be paged at the same time, thus reducing the system resource consumption.

Some embodiments described herein relate to a system for providing WUS functionality, comprising a network node (e.g. eNB 120) transmitting the WUS and a wireless device (e.g. UE 110), such as an IoT or MTC device, receiving the WUS. Some embodiments will be described in terms of eMTC, in which only 2 out of 6 physical resource blocks (PRBs) comprising a narrowband are conventionally used for WUS. However, those skilled in the art will appreciate that the embodiments are equally applicable to other technologies, such as NB-IoT, assuming the second generation WUS in that case is allocated outside the single PRB NB-IoT carrier.

Figure 3:
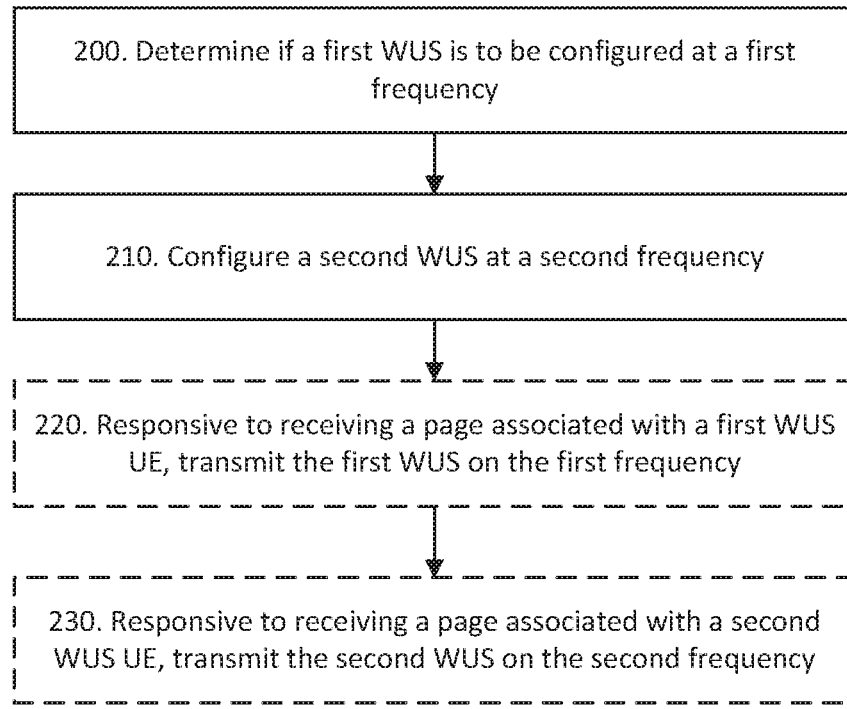
FIG. 3 is a flow chart illustrating a method which can be performed in a network node.

FIG. 3 is a flow chart illustrating a method which can be performed in a network node. In some embodiments, the network node can be a radio access node 120. The radio access node 120 can be an eNB or gNB as have been described herein. The method can include:

Step 200: The network node determines whether a first WUS should be used or not. The first WUS can be associated with a first generation of a wireless system specification. This determination is typically made by reading some configuration information, e.g., in a stored configuration file. Responsive to determining that the first WUS is to be used, the first WUS is allocated at a first frequency. The first WUS configuration can be then broadcast, for example, in system information. This first frequency location can be located, for example, on two resource blocks in an LTE system supporting Rel-15 WUS signal, where the resource blocks are located within the set of six resource block constituting a corresponding paging narrowband, i.e., where a UE subsequently monitors MPDCCH to detect paging messages.

Step 210: A second WUS is configured or allocated in a second frequency location. The second WUS can be associated with a second generation of a wireless system specification. In some embodiments, this configuration can be dependent on whether the first WUS is used or not. In some embodiments, the location and/or number of frequencies that are used for the second WUS can depend on whether the first WUS is configured or not such that, for example, three frequencies can be used if the first WUS is not configured and two frequencies can be used if the first WUS is configured. The second frequency location(s) can be determined based at least in part on the first frequency location. In some embodiments, the network node can opt to use different UE configurations for the second WUS(s) depending on whether the first WUS is used or not. In another embodiment, the configuration can include a UE grouping configuration. This can include determining which UEs are sensitive to the first, second and third frequency and the first and second frequency, respectively, depending on whether the first WUS is used or not (this will be further detailed with respect to FIG. 4). In another embodiment, the UE grouping configuration can also differ, e.g., in the total number of groups being used and determining to which group a certain UE belongs.

Step 220: (optional) Responsive to determining that a paging message is to be transmitted to a UE associated with the first WUS, the first WUS is transmitted according to the determined WUS/UE configuration.

Step 230: (optional) Responsive to determining that a paging message is to be transmitted to a UE associated with the second WUS, the second WUS is transmitted according to the determined WUS/UE configuration.

It will be appreciated that one or more of the above steps can be performed simultaneously and/or in a different order. Also, steps illustrated in dashed lines are optional and can be omitted in some embodiments.

In some embodiments, frequencies of the first and second WUSs can be located on separate PRBs within the same paging narrowband. In other embodiments, the first and second frequencies can be located on separate narrowbands. In yet another embodiment, further frequency multiplexing can be performed based on parameter(s) such as UE identity, within the paging narrowband or a separate narrowband on two or more frequency locations.

Figure 4:
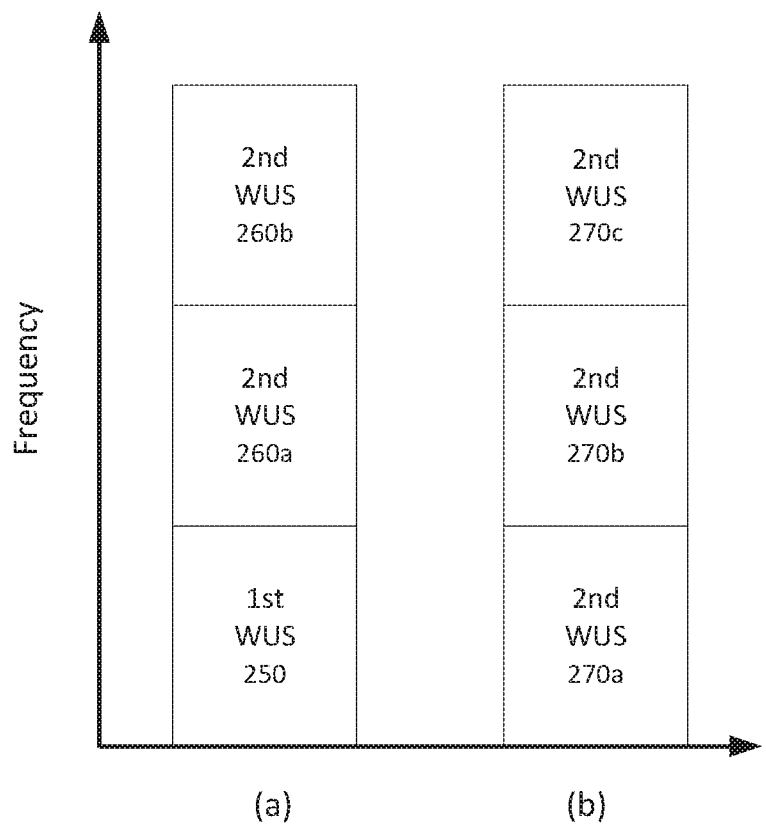
FIG. 4 illustrates example frequency allocations of the WUS.

FIG. 4 illustrates example frequency allocations of the WUS. FIG. 4(*a*) illustrates an example second generation WUS configuration when co-existing with a first generation WUS. FIG. 4(*b*) illustrates an example configuration of second generation WUS only.

As previously discussed, FIG. 4 further illustrates embodiments where the number of frequencies used for the second WUS depends on the configuration of the first WUS. For example, in FIG. 4(*a*), two frequencies (260*a*, 260*b*) can be used for the second WUS if the first WUS (250) is configured in a first frequency location. As shown in FIG. 4(*b*), three frequencies (270*a*, 270*b*, 270*c*) can be used for the second WUS if the first WUS is not configured.

In some embodiments, the frequency location(s) of the second WUS can be determined implicitly from the frequency location of the first WUS. For example, the first WUS may be located on the lowermost two PRBs within a paging narrowband, which may implicitly determine the frequency of the second WUS to be one (or more) of the remaining four PRB s within the paging narrowband. A PRB in this aspect refers to the frequency width of a PRB, as shown in FIG. 4. It may also be that the second WUS is specified in a standard to be located at an offset frequency relative to the first WUS. In another embodiment, the frequency location of the second WUS may instead be explicitly signaled. UE group information may be signaled in system information or explicitly specified in a standard.

In some embodiments, further WUS UE grouping (i.e., narrowing down of which UEs are sensitive to the WUS signal) may be performed by altering, e.g., the scrambling sequence for the WUS generation. Also, this operation may depend on the configuration of the first WUS, e.g., by controlling the total number of UE groups.

In some embodiments, the second WUS has been described as occupying frequencies different from the first WUS. Alternatively, or additionally, the second WUS can be located in different time locations than the first WUS. In some embodiments, the duration of a transmission of a second WUS can differ from the duration of the first WUS. In one embodiment, the second WUS can be transmitted in a separate frequency location, and in time locations which are different but may at least partially overlap with the first WUS.

In some embodiments, different mechanisms for determining which group a particular UE belongs to can be implemented. As discussed, the group can be determined based on a UE identity. Alternatively, or additionally, the group can be determined based on a metric representing a coverage level of a UE, the metric being known to both the UE and the network. As non-limiting examples, this metric can be based on one or more of an enhancement coverage level as used by the UE in a previously performed random access procedure, a received signal strength or quality measure as previously measured and reported by the UE, a coverage enhancement level or mode for the UE as previously configured by the network, and others.

As illustrated in FIG. 4(*a*), the location within a narrowband of a first (lowermost) group WUS resource (250) can be configured and the location of a second (uppermost) group WUS resource(s) (260*a*, 260*b*) can be accordingly located on the subsequent two PRB s.

Figure 5:
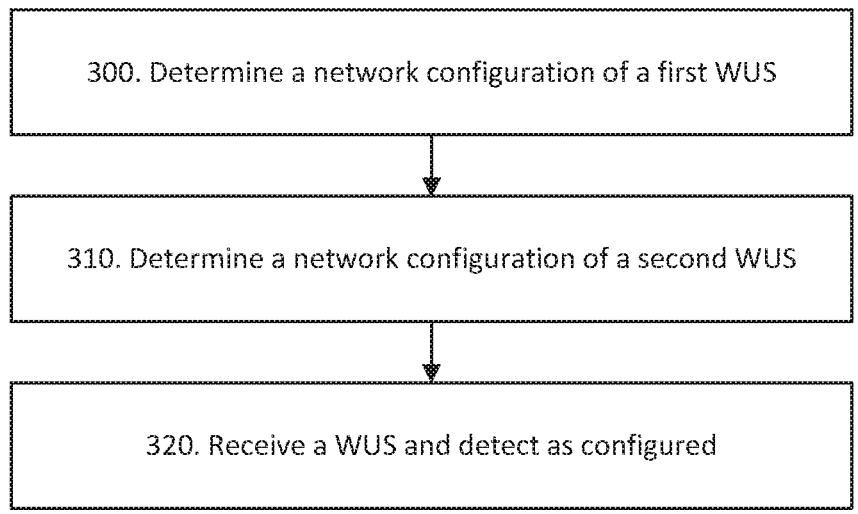
FIG. 5 is a flow chart illustrating a method which can be performed in a wireless device.

FIG. 5 is a flow chart illustrating a method which can be performed in a wireless device, such as UE 110. The method can include:

Step 300: A device supporting a second WUS determines a network configuration of a first WUS, including determining if the first WUS is configured. In some embodiments, the time and/or frequency location of the first WUS can be further determined from, e.g., system information signaling obtained from a network node.

Step 310: The device determines the configuration of the second WUS. In some embodiments, this determination can include determining a frequency and/or time for WUS monitoring that the UE should monitor. In another embodiment, it may include a specific WUS sequence to monitor, based, e.g., on a UE ID. The sequence may be generated by a network node (e.g. eNB) dependent base sequence and a UE group or UE-specific scrambling code. In some embodiments, the configuration can be dependent on whether, and how, the first WUS is configured. This includes the possibility that some, or all, of the parameters related to the second WUS characteristics, such as time and frequency location and specific WUS sequence, are determined at least in part based on parameters of the first WUS.

Step 320: The wireless device attempts to detect a WUS on the determined frequency location and configuration.

It will be appreciated that one or more of the above steps can be performed simultaneously and/or in a different order. Also, steps illustrated in dashed lines are optional and can be omitted in some embodiments.

In some embodiments, the second (e.g. Rel-16) WUS can be a generalization of the first (e.g. Rel-15) WUS, such that the latter is special case of the first. The second generation WUS could be a generalizing by using, for example:

A multitude of code sequences

A multitude of physical signals

A multitude of frequency locations (Note that time domain is excluded in this example as it may lead to longer decoding time for Rel-16 UEs, hence counteracting the power saving benefit of the WUS).

An example of Rel-16 UE groups is as follows:

| Group: | Rd-15 UE behavior: | Rd-16 UE behavior: |
|---|---|---|
| Rel-15 or all UEs | Wake up | Wake up |
| Rel-16 group 1 | Ignore | Wake up if UE is in group 1 |
| Rel-16 group 2 | Ignore | Wake up if UE is in group 2 |
| Rel-16 group 3 | Ignore | Wake up if UE is in group 3 |
| Rel-16 group 4 | Ignore | Wake up if UE is in group 4 |

The grouping of UEs could be determined based on UE_ID. For example:

UE-group number=floor(floor(UE_ID/$N*Ns$)/$Nn$)

In this example, the modulus operation is used to determine the Paging Frame. All UEs sharing a Paging Occasion would belong to the same UE-group unless other bits of the UE_ID are used in this way.

That is, a Rel-16 UE would monitor both the signal, code sequence, and/or frequency location associated with the "Rel-15/all UEs" row and the row with its UE group. (Note that the "all UEs" group must be included for common paging such as System Information change notification). A Rel-15 UE will only monitor the Rel-15 WUS signal, code sequence, and/or frequency location and hence its behaviour is unchanged.

A benefit of overlapping first generation (Rel-15) WUS and second generation (Rel-16) WUS, that is not using different frequency location but rather different signal or code sequence, would be that scheduling is simplified and that resource consumption will not be increased when paging all UEs (e.g. common paging) or when multiplexing Rel-15 and Rel-16 UEs in the paging message.

Accordingly, some embodiments described herein allow for providing a second WUS resource configuration in a system already providing a first WUS resource configuration. To ensure backward/forward compatibility and support for both older and newer UEs, it may be beneficial if the network is able to support both generations of WUS resources. From the UE perspective, it may be undesirable to mix or combine the two generations since that may require an extended monitoring by the UE, increasing power consumption and thereby partially negating the benefits of the WUS. Some embodiments may still include such a solution for other reasons, e.g., limited network resources.

Figure 6:
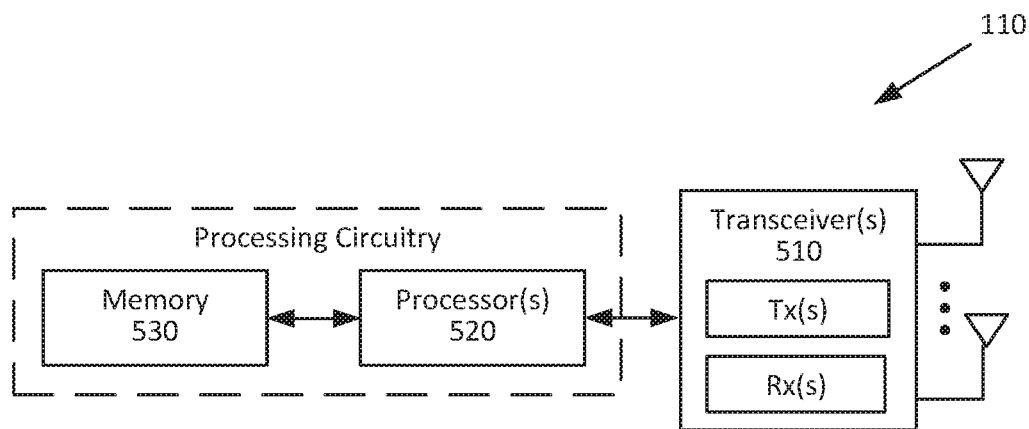
FIG. 6 is a block diagram of an example wireless device.

FIG. 6 is a block diagram of an example wireless device, UE 110, in accordance with certain embodiments. In some embodiments, wireless device 110 can be a NB-IoT device. UE 110 includes a transceiver 510, processor 520, and memory 530. In some embodiments, the transceiver 510 facilitates transmitting wireless signals to and receiving wireless signals from radio access node 120 (e.g., via transmitter(s) (Tx), receiver(s) (Rx) and antenna(s)). The processor 520 executes instructions to provide some or all of the functionalities described above as being provided by UE, and the memory 530 stores the instructions executed by the processor 520. In some embodiments, the processor 520 and the memory 530 form processing circuitry.

The processor 520 can include any suitable combination of hardware to execute instructions and manipulate data to perform some or all of the described functions of a wireless device, such as the functions of UE 110 described above. In some embodiments, the processor 520 may include, for example, one or more computers, one or more central processing units (CPUs), one or more microprocessors, one or more application specific integrated circuits (ASICs), one or more field programmable gate arrays (FPGAs) and/or other logic.

The memory 530 is generally operable to store instructions, such as a computer program, software, an application including one or more of logic, rules, algorithms, code, tables, etc. and/or other instructions capable of being executed by a processor 520. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by the processor 520 of UE 110.

Other embodiments of UE 110 may include additional components beyond those shown in FIG. 6 that may be responsible for providing certain aspects of the wireless device's functionalities, including any of the functionalities described above and/or any additional functionalities (including any functionality necessary to support the solution described above). As just one example, UE 110 may include input devices and circuits, output devices, and one or more synchronization units or circuits, which may be part of the processor 520. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 7:
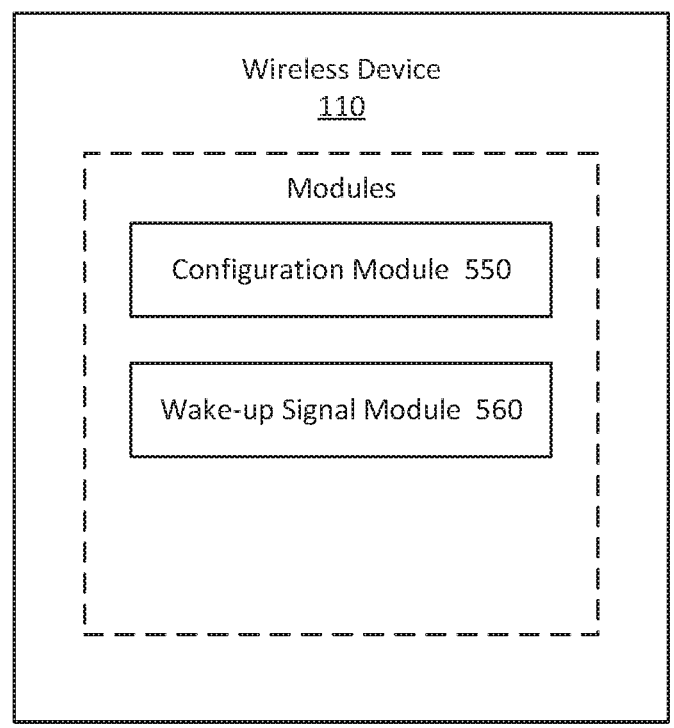
FIG. 7 is a block diagram of an example wireless device with modules.

In some embodiments, the wireless device UE 110 may comprise a series of modules configured to implement the functionalities of the wireless device described above. Referring to FIG. 7, in some embodiments, the wireless device 110 may comprise a configuration module 550 for determining a configuration of a first WUS and a configuration of a second WUS, and a wake-up signal module 560 for receiving and detecting a WUS in accordance with the configuration.

It will be appreciated that the various modules may be implemented as combination of hardware and software, for instance, the processor, memory and transceiver(s) of UE 110 shown in FIG. 6. Some embodiments may also include additional modules to support additional and/or optional functionalities.

Figure 8:
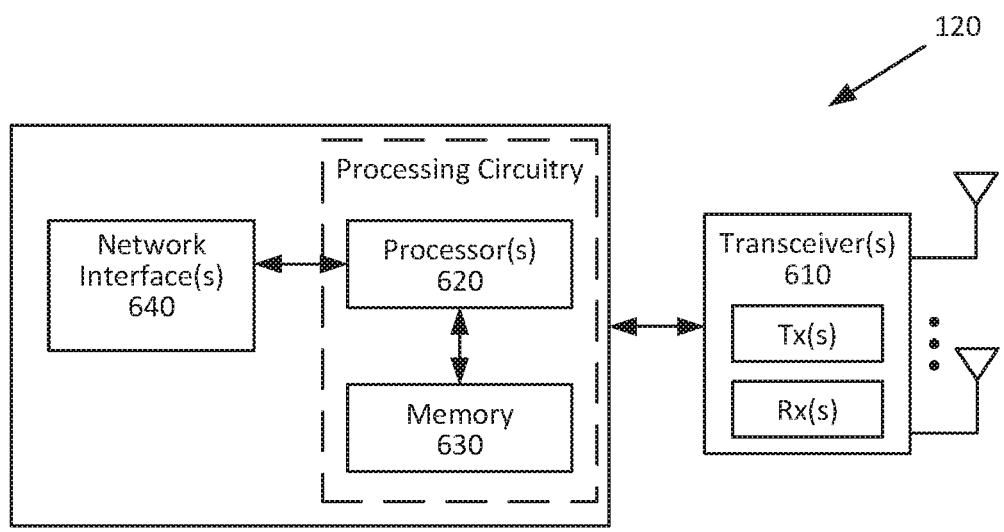
FIG. 8 is a block diagram of an example network node.

FIG. 8 is a block diagram of an exemplary network node 120, in accordance with certain embodiments. In some embodiments, the network node 120 can be a radio access node 120. The radio access node 120 can be an eNB or gNB as have been described herein.

Network node 120 can include one or more of a transceiver 610, processor 620, memory 630, and network interface 640. In some embodiments, the transceiver 610 facilitates transmitting wireless signals to and receiving wireless signals from wireless devices, such as UE 110 (e.g., via transmitter(s) (Tx), receiver(s) (Rx), and antenna(s)). The processor 620 executes instructions to provide some or all of the functionalities described above as being provided by a radio access node 120, the memory 630 stores the instructions executed by the processor 620. In some embodiments, the processor 620 and the memory 630 form processing circuitry. The network interface 640 can communicate signals to backend network components, such as a gateway, switch, router, Internet, Public Switched Telephone Network (PSTN), core network nodes or radio network controllers, etc.

The processor 620 can include any suitable combination of hardware to execute instructions and manipulate data to perform some or all of the described functions of network node 120/130, such as those described above. In some embodiments, the processor 620 may include, for example, one or more computers, one or more central processing units (CPUs), one or more microprocessors, one or more application specific integrated circuits (ASICs), one or more field programmable gate arrays (FPGAs) and/or other logic.

The memory 630 is generally operable to store instructions, such as a computer program, software, an application including one or more of logic, rules, algorithms, code, tables, etc. and/or other instructions capable of being executed by a processor 620. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 640 is communicatively coupled to the processor 620 and may refer to any suitable device operable to receive input for network node 120, send output from node 120, perform suitable processing of the input or output or both, communicate to other devices, or any combination of the preceding. The network interface 640 may include appropriate hardware (e.g., port, modem, network interface card, etc.) and software, including protocol conversion and data processing capabilities, to communicate through a network.

Other embodiments of network node 120 can include additional components beyond those shown in FIG. 8 that may be responsible for providing certain aspects of the node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIGS. 6 and 8 may be included in other network nodes. Other network nodes may optionally include or not include a wireless interface (such as the transceiver described in FIGS. 6 and 8).

Figure 9:
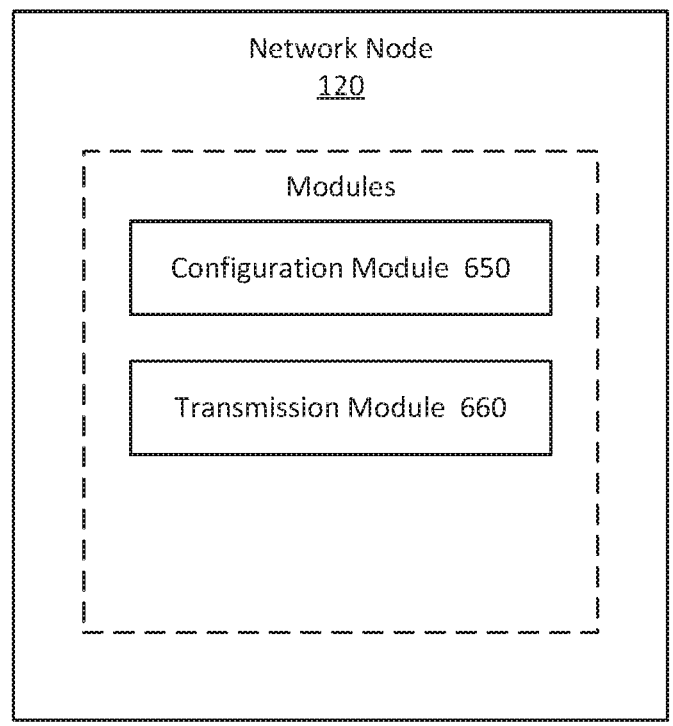
FIG. 9 is a block diagram of an example network node with modules.

In some embodiments, the network node 120, may comprise a series of modules configured to implement the functionalities of the network node described above. Referring to FIG. 9, in some embodiments, network node 120 can comprise a configuration module 650 for configuring a first WUS resource configuration and a second WUS resource configuration, and a transmission module 660 for transmitting a WUS in accordance with the configuration.

It will be appreciated that the various modules may be implemented as combination of hardware and software, for instance, the processor, memory and transceiver(s) of network node 120 shown in FIG. 8. Some embodiments may also include additional modules to support additional and/or optional functionalities.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

Glossary

The present description may comprise one or more of the following abbreviation:
3GPP Third Generation Partnership Project
ACK Acknowledgement
AP Access point
ARQ Automatic Repeat Request
BS Base Station
BSC Base station controller
BTS Base transceiver station
CA Carrier Aggregation
CC Component carrier
CCCH SDU Common Control Channel SDU
CG Cell group
CGI Cell Global Identifier
CQI Channel Quality information
CSI Channel State Information
DAS Distributed antenna system
DC Dual connectivity
DCCH Dedicated Control Channel
DCI Downlink Control Information
DL Downlink
DMRS Demodulation Reference Signal
eMBB Enhanced Mobile Broadband
eNB E-UTRAN NodeB or evolved NodeB
ePDCCH enhanced Physical Downlink Control Channel
E-SMLC evolved Serving Mobile Location Center
E-UTRA Evolved UTRA
E-UTRAN Evolved UTRAN
FDM Frequency Division Multiplexing
HARQ Hybrid Automatic Repeat Request
HO Handover
IoT Internet of Things
LTE Long-Term Evolution
M2M Machine to Machine
MAC Medium Access Control
MBMS Multimedia Broadcast Multicast Services
MCG Master cell group
MDT Minimization of Drive Tests
MeNB Master eNode B
MME Mobility Management Entity
MSC Mobile Switching Center MSR Multi-standard Radio
MTC Machine Type Communication
NACK Negative acknowledgement
NDI Next Data Indicator
NR New Radio
O&M Operation and Maintenance
OFDM Orthogonal Frequency Division Multiplexing
OFDMA Orthogonal Frequency Division Multiple Access
OSS Operations Support System
PCC Primary Component Carrier
P-CCPCH Primary Common Control Physical Channel
PCell Primary Cell
PCG Primary Cell Group
PCH Paging Channel
PCI Physical Cell Identity
PDCCH Physical Downlink Control Channel
PDSCH Physical Downlink Shared Channel
PDU Protocol Data Unit
PGW Packet Gateway
PHICH Physical HARQ indication channel
PMI Precoder Matrix Indicator
ProSe Proximity Service
PSC Primary serving cell
PSCell Primary SCell
PUCCH Physical Uplink Control Channel
PUSCH Physical Uplink Shared Channel
RAT Radio Access Technology
RB Resource Block
RF Radio Frequency
RLM Radio Link Management
RNC Radio Network Controller
RRC Radio Resource Control
RRH Remote Radio Head
RRM Radio Resource Management
RRU Remote Radio Unit
RSRP Reference Signal Received Power
RSRQ Reference Signal Received Quality
RSSI Received Signal Strength Indicator
RSTD Reference Signal Time Difference
RTT Round Trip Time
SCC Secondary Component Carrier
SCell Secondary Cell
SCG Secondary Cell Group
SCH Synchronization Channel
SDU Service Data Unit
SeNB Secondary eNodeB
SGW Serving Gateway
SI System Information
SIB System Information Block
SINR Signal to Interference and Noise Ratio
SNR Signal Noise Ratio
SPS Semi-persistent Scheduling
SON Self-organizing Network
SR Scheduling Request
SRS Sounding Reference Signal
SSC Secondary Serving Cell
TTI Transmission Time Interval
Tx Transmitter
UE User Equipment
UL Uplink
URLLC Ultra-Reliable Low Latency Communication
UTRA Universal Terrestrial Radio Access
UTRAN Universal Terrestrial Radio Access Network
V2V Vehicle-to-vehicle
V2X Vehicle-to-everything
WLAN Wireless Local Area Network

The invention claimed is:

1. A method performed by a network node, the method comprising:
allocating a first wake-up signal (WUS) at a first frequency location;
allocating a second WUS at a second frequency location based at least in part on the first frequency location;
responsive to receiving a page associated with a wireless device configured for the first WUS, transmitting the first WUS on the first frequency location wherein the first WUS is associated with a first generation of a wireless system specification; and
responsive to receiving a page associated with a wireless device configured for the second WUS, transmitting the second WUS on the second frequency location wherein the second WUS is associated with a second generation of the wireless system specification.

2. The method of claim 1, further comprising, allocating the first WUS at a first time location and allocating the second WUS at a second time location.

3. The method of claim 1, wherein the first generation of a wireless system specification is 3GPP specification Release 15 and the second generation of wireless system specification is 3GPP specification Release 16.

4. The method of claim 1, wherein a scrambling sequence for the first WUS differs from a scrambling sequence for the second WUS.

5. The method of claim 1, further comprising, allocating a plurality of second WUSs at a plurality of second frequency locations.

6. The method of claim 5, wherein each of the plurality of second WUSs corresponds to a wireless device grouping.

7. The method of claim 5, further comprising, determining one of the plurality of second WUSs to transmit in accordance with an identity of the wireless device configured for the second WUS.

8. The method of claim 5, wherein the plurality of second WUSs are frequency multiplexed within a paging narrowband.

9. The method of claim 1, wherein the first and second frequency locations are on separate resource blocks within a paging narrowband.

10. The method of claim 1, wherein the first and second frequency locations are on separate paging narrowbands.

11. A network node comprising a radio interface and processing circuitry configured to:
allocate a first wake-up signal (WUS) at a first frequency location;
allocate a second WUS at a second frequency location based at least in part on the first frequency location;
responsive to receiving a page associated with a wireless device configured for the first WUS, transmit the first WUS on the first frequency location wherein the first WUS is associated with a first generation of a wireless system specification; and
responsive to receiving a page associated with a wireless device configured for the second WUS, transmit the second WUS on the second frequency location wherein the second WUS is associated with a second generation of the wireless system specification.

12. The network node of claim 11, further configured to, allocate the first WUS at a first time location and allocate the second WUS at a second time location.

13. The network node of claim 11, wherein the first generation of a wireless system specification is 3GPP specification Release 15 and the second generation of wireless system specification is 3GPP specification Release 16.

14. The network node of claim 11, wherein a scrambling sequence for the first WUS differs from a scrambling sequence for the second WUS.

15. The network node of claim 11, further configured to, allocate a plurality of second WUSs at a plurality of second frequency locations.

16. The network node of claim 15, wherein each of the plurality of second WUSs corresponds to a wireless device grouping.

17. The network node of claim 15, further configured to, determine one of the plurality of second WUSs to transmit in accordance with an identity of the wireless device configured for the second WUS.

18. The network node of claim 15, wherein the plurality of second WUSs are frequency multiplexed within a paging narrowband.

19. The network node of claim 11, wherein the first and second frequency locations are on separate resource blocks within a paging narrowband.

20. The network node of claim 11, wherein the first and second frequency locations are on separate paging narrowbands.

* * * * *